United States Patent [19]

Albertson

[11] 4,088,547
[45] May 9, 1978

[54] METHOD FOR PRODUCING A COATED METAL NODULAR SOLAR HEAT COLLECTOR

[75] Inventor: Clarence E. Albertson, Villa Park, Ill.

[73] Assignee: Borg-Warner Corporation, Chicago, Ill.

[21] Appl. No.: 719,544

[22] Filed: Sep. 1, 1976

[51] Int. Cl.² .................. C25D 5/34; C25D 5/10; F24J 3/02
[52] U.S. Cl. ................... 204/32 R; 204/40; 126/270; 126/271
[58] Field of Search ............... 204/32 R, 40; 126/270, 126/271

[56] References Cited

U.S. PATENT DOCUMENTS

| | | | |
|---|---|---|---|
| 3,518,168 | 6/1970 | Byler et al. | 204/32 R |
| 3,857,681 | 12/1974 | Yates et al. | 204/40 |
| 3,920,413 | 11/1975 | Lowery | 204/32 R |
| 4,005,698 | 2/1977 | Cuomo et al. | 126/270 |

Primary Examiner—G. L. Kaplan
Assistant Examiner—William Leader
Attorney, Agent, or Firm—William S. McCurry

[57] ABSTRACT

A solar heat collector comprising a metallic substrate having nodular or dendritic surfaces coated with a black absorber coating, and the method of preparing same.

4 Claims, No Drawings

METHOD FOR PRODUCING A COATED METAL NODULAR SOLAR HEAT COLLECTOR

BACKGROUND OF THE INVENTION

The present invention relates to solar heat collectors and more particularly to such heat collectors wherein metallic nodular or dendritic surfaces are employed to increase the absorbtion effectiveness of the collector.

U.S. Pat. No. 3,920,413 discloses a panel for absorbing solar energy comprising an aluminum substrate coated with bright nickel with an overcoat of black nickel.

An article in Machine Design, Apr. 3, 1975, at page 24 discloses a dendritic solar energy absorber made by vapor depositing tungsten on a substrate. It is stated that better than 96% of light from the solar spectrum is captured by the tungsten dendrite array.

SUMMARY OF THE INVENTION

The solar collector of the present invention utilizes a practical, inexpensive, electroplated nodular-metal coated metal surface to provide an efficient solar energy absorber.

The present solar collector is made by growing copper dendrites electrolytically on a metal substrate, plating the dendritic surfaces with smooth copper, and then plating the smooth copper-coated dendritic surfaces with a black heat absorbing coating, such as black nickel or black chrome.

DESCRIPTION OF THE INVENTION

In order to better understand the principles of the present invention, the following examples are provided for illustrative purposes only:

EXAMPLE 1

A 7 inch × ¾ inch OD copper tube was cleaned, etched 5 sec. in 50% nitric acid, rinsed and nodule plated in an electrolyte containing 210 g. per liter of hydrated copper sulfate and 75 g. per l. sulfuric acid at room temperature. Copper dendrites were grown on the tube for 2 minutes at 35 amperes and then coated with smooth copper at 5 amperes for ¾ hour to form a copper nodule surface. About 5.6 g. of copper was plated on the tube in this nodule plating sequence.

The nodule plated tube was plated with black nickel, as directed in Metal Finishing Handbook, 1974 Ed., p. 350, using the chloride bath which contained 37.5 g. $NiCl_2$, 15 g. $NH_4Cl$, 7½ g. NaSCN and 15 g. $ZnCl_2$ in 500 cc $H_2O$. The tube was plated at 0.4 to 0.5 amperes, RT, for 5 minutes to form a black nickel coating.

EXAMPLE 2

A 7 inch × ¾ inch OD copper tube having a smooth surface was plated with black nickel in accordance with the black nickel plating procedure of Example 1 except that only 0.2 to 0.25 amperes for 5 minutes were necessary to provide the black nickel coating to the smooth surface copper tube, due to less surface area to be plated.

EMISSIVITY TESTS

In order to determine the efficiency and effectiveness of the black nickel plated nodule tube of Example 1 versus the black nickel plated smooth surface tube of Example 2, emissivity tests and measurements were made on the respective tubes. In order to provide a standard for testing the tubes of Examples 1 and 2, a third tube of ¾ inch copper having a length of 7 inches was coated with Nextel Velvet Paint, 101-C10 Black, obtained from the 3M Corporation. This particular black paint was used because it is referred to and used as a reference material in NASA publication TMX-71596, "Spectral Reflectance Properties of Black Chrome for Use as a Solar Selective Coating." This black paint is recognized in the art as a very high absorbing material.

TIME-TEMPERATURE HISTORY IN DIRECT SUNLIGHT

Ten milliliters of deionized water were measured into each of the three tubes and a thermocouple inserted into the water. The three samples were supported on polystyrene foam carved away to knife-edges in a box covered with a thin polymethacrylate lid, and placed in the direct sun. The temperatures of the water in each sample were monitored. The recording instrument was a Digitec 1590 Data Logger, Model 590TF, Type T, by United Systems Corporation. Thermocouples were copperconstantan.

The measured temperatures of the three tubes for the tests which were run on May 23, 1975 at Des Plaines, Illinois are shown in TABLE I below. The outdoor temperature varied from 82° to 87.5° F during the time frame of the tests.

TABLE I

| | | Temperature ° F Tube | |
|---|---|---|---|
| Time | Black Paint | Smooth Black Nickel | Dendritic Black Nickel |
| 1344 | 85 | 85 | 85 |
| 1400 | 147 | 147 | 147 |
| 1420 | 173 | 182 | 188 |
| 1440 | 174 | 185 | 194 |
| 1500 | 178 | 188 | 198 |
| 1520 | 179 | 188 | 198 |
| 1540 | 176 | 185 | 193 |

EMISSIVITY — DIRECT AND INDIRECT MEASUREMENT

The smooth surface tube of Example 2 and the dendritic surface of Example 1 were tested for emissivity using a Barnes Engineering Company radiometric microscope, Model RM-1.

A small square of Nextel black paint, about 4 mm on a side, was sprayed on the tube surfaces near the thermocouple. This gave a surface area of high emissivity, but of sufficiently small area so that the temperature of the tube was not greatly disturbed. The tubes were heated internally by radiation from a coaxial heater. The tubes were supported on narrow Teflon ® strips near their ends to avoid conduction losses.

The temperature of the small Nextel painted area was measured with the radiometric microscope, assuming an emissivity of 1.0. The microscope was shifted to another spot on the unknown surface between the paint and the thermocouple. The temperature reading was returned to its previous value, by adjusting the emissivity control, and the emissivity value read directly from the setting of the emissivity control. This was done at temperatures of 150°, 200°, and 250° F for both the smooth black nickel and dendritic black nickel tubes. Various other spots on the tubes were also measured in order to get some idea of the reproducibility of the measurement.

For the indirect measurement, the effective target radiance is measured on the radiometric microscope. The target temperature is read from the thermocouple, the ambient temperatures from a thermometer, and the effective black body radiance and the ambient background radiance are read from a chart in the instruction manual for the microscope. The various emissivity values were then calculated.

TABLE II below shows the measured values of the emissivities of the dendritic black nickel and the smooth black nickel coated tubes.

TABLE II

| Temperature | Emissivity | |
|---|---|---|
| | Dendritic with Black Nickel Coating | |
| | Direct Measure | Indirect Measure |
| 150° F | 0.38 | 0.29 |
| 200° F | 0.36 | 0.29 |
| 250° F | 0.36 | 0.29 |
| | Smooth with Black Nickel Coating | |
| 150° F | 0.56 | 0.54 |
| 200° F | 0.59 | 0.58 |
| 250° F | 0.59 | 0.65 |

Since the lower the value of emissivity, the better the solar collector, it is clear from TABLE II that the emissivity of the dendritic surface coated with black nickel is quite superior to the smooth surface coated with black nickel.

While the present invention has been described using copper dendrites on a copper substrate, it is to be understood that copper, as well as other metal dendrites such as zinc and nickel, can be electroplated on other metal substrates such as aluminum and steel. Black Chrome, described in NASA publication TMX-71596, can be used in place of black nickel. Further, while the disclosed examples utilize tubing, other shapes of substrate such as flat or curved metal sheets may be employed.

While this invention has been described in connection with a certain specific embodiment thereof, it is to be understood that this is by way of illustration and not by way of limitation; and the scope of the appended claims should be construed as broadly as the prior art will permit.

I claim:

1. A method for making a solar heat collector comprising the steps of (1) cleaning a metallic substrate; (2) etching said substrate; (3) rinsing said substrate; (4) electrodepositing a metal on said substrate at a high current density to produce dendrite surfaces on said substrate; and (5) electrodepositing a black solar absorbing coating on said plated dendrite surfaces selected from the group consisting of black nickel and black chrome.

2. A method in accordance with claim 1 wherein the metallic substrate is copper.

3. A method in accordance with claim 1 wherein the metallic substrate is copper and the electrodeposited metal of step (4) is copper.

4. A method in accordance with claim 3 wherein a layer of copper is electrodeposited on said dendrite surfaces prior to the step of electrodepositing said black solar absorbing coating.

* * * * *